United States Patent Office 3,196,520
Patented July 27, 1965

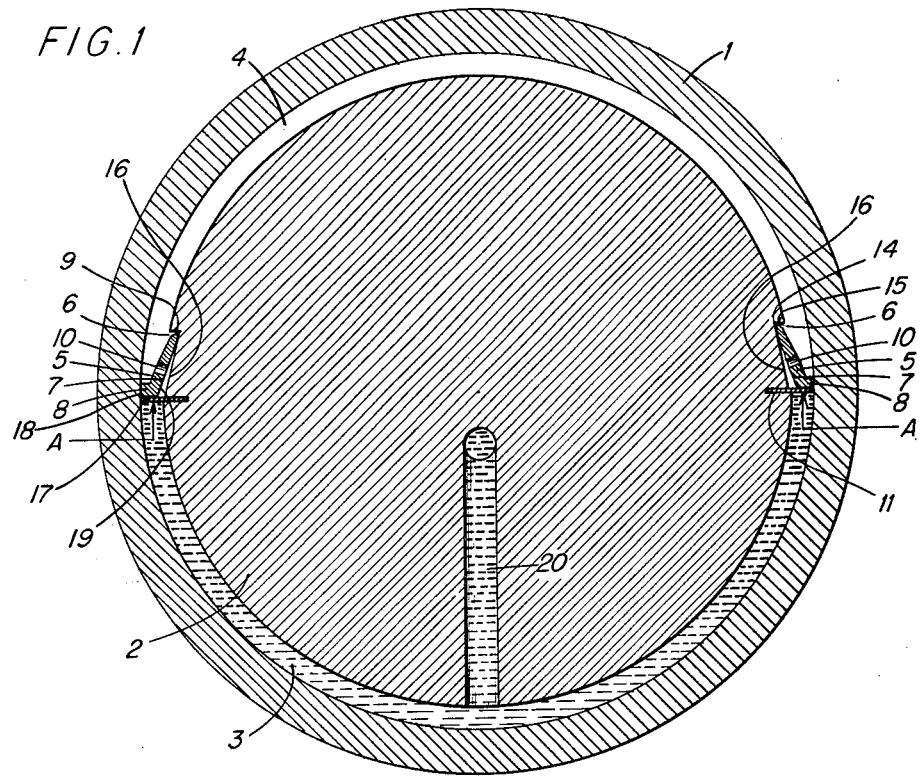

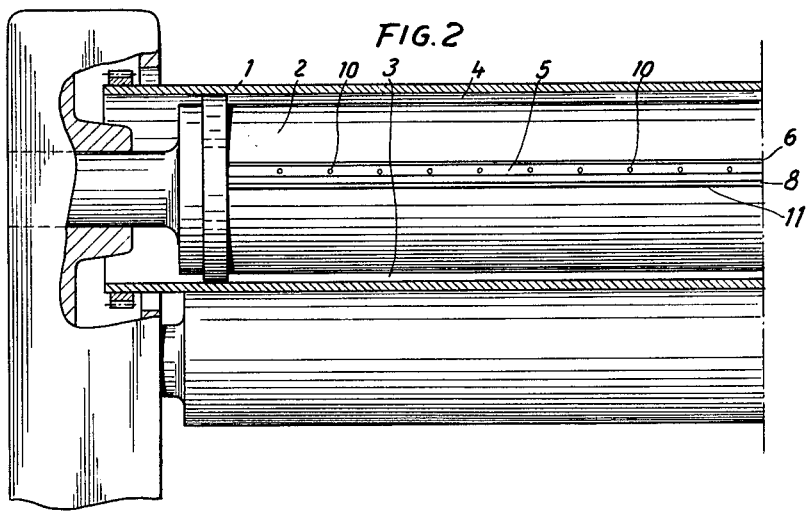

3,196,520
TUBULAR ROLLER WITH CARRIER CORE AND DIVISION OF THE GAP BETWEEN THE ROLLER AND CORE INTO LONGITUDINAL CHAMBERS
Valentin Appenzeller, Krefeld, Germany, assignor to Eduard Küsters Maschinenfabrik, Krefeld, Germany, a German company
Filed Mar. 5, 1963, Ser. No. 262,888
Claims priority, application Germany, Nov. 10, 1962, K 48,292
4 Claims. (Cl. 29—116)

The invention relates to a tubular roller for pressure treatment of webs of material, for example for smoothing and embossing paper and other materials, said roller having stationary core located in the interior of the tube, extending in the same direction as and serving as support for the tube, said core having a cross-sectional area which is smaller than the internal cross-sectional area of the tube leaving a gap or clearance between the core and the inner wall of the tube on the entire periphery thereof and having at opposite longitudinal sides, packing strips arranged in an inclined position extending from the core towards the operative side of the roller and bearing against the inner peripheral wall of the tube and thereby dividing the gap or clearance between the tube and core into two longitudinal chambers with different internal pressures.

The applicant's U.S. patent Appenzeller 2,908,964 shows details of a machine of the general type to which the present invention relates. Such tubular rollers are employed for the pressure treatment of webs of material, for example for glazing and embossing paper and other materials, for squeezing out the moisture from textiles, for calendering and stretching plastic and rubber foils and the like, as well as for other pressing operations. They present the advantages that the pressure prevailing on the operating side of the tubular roller is transmitted by a pressure medium accommodated in the longitudinal chamber on this side of the roller, to the carrier core which takes up the pressure load and can bend or deflect under this load, while the tubular roller exerts a uniform pressure along its entire length without bending.

The use of prior, known rollers has included the following difficulties:

In the case of these tubular rollers, which are frequently of great length, the problem arises of forming a reliable packing for dividing the gap into longitudinal chambers and which will be able to meet the requirements.

Packings in the form of strips, for example of bronze, which are arranged in radial slots in the carrier core and loaded at the rear by springs in these radial slots and tending to force the strips out of the slots and press their outer edge against the inner wall of the roller tube, are primarily open to the objection that the one-sided pressure acting on the strip causes it to twist or cant with the result that its sliding movement in the slot is prevented or impeded, consequently the inner bore of the tubular roller must be very accurate if the packing strip is to fulfill its purpose in a manner which is anything like satisfactory. Moreover, the pressure exerted by the packing strip against the inner wall of the tube is always of the same magnitude and is independent of the pressure prevailing in the longitudinal chamber at the operative side of the tubular hollow element. When the ends of the tubular hollow element are mounted by means of self-aligning ball bearings on the core, the bore in the tubular hollow element at one of its ends should vary only very slightly from the bore in its other end, because otherwise the ball bearing at the one end would not be coaxial with the ball bearing at the other end. In the case of long tubes it is difficult to obtain such accuracy of machining.

In the case of packings in the form of strips which are fixed along one longitudinal edge in the core and extend in inclined position towards the direction of pressure and bear against the wall of the tube, the requirements as regards tolerances are less exacting. Such packings are, however, not suitable for high speeds. The portion of strip bearing against the inner wall of the tube which effects the actual packing or sealing, must be composed of a highly abrasion-resisting foil of plastic material because bronze sheet packings would wear too quickly. At high speeds the plastic foil becomes heated very strongly at its point bearing against the inner wall of the tube and commences to smear. Such a packing is not suitable for working at high temperatures if, for example, oil is provided as pressure medium in the longitudinal chamber at the operative side of the roller and serves at the same time as heating medium.

According to the invention the strips, preferably composed of bronze or some similar material or of sintered graphite or plastic substance, are mounted in knife-edge fashion on the core to swing in a transverse direction and bear against the inner wall of the roller tube with a substantially radially bent portion at the projecting end forming the edge subjected to wear. The main advantage of this construction of packing is that it can adjust itself to any unroundness and inaccuracy of the inner wall of the roller tube without having to overcome a greater resistance in the process and that the pressure exerted against the roller tube is always a function of the magnitude of the pressure prevailing in the longitudinal chamber at the operative side of the roller. Consequently the packing always takes into consideration the actual conditions without causing any inconveniences.

In particular, the carrier core according to the invention may have for each packing strip a recess forming with its opening an acute angle located in the direction opposite to the pressure on the operative side of the roller and the packing strip diverging from the sides of the recess angle can bear with one of its ends forming a knife edge against the inner apex of the recess.

A spring element, preferably in the form of a leaf spring, may be provided on the carrier core and tends to press the knife edge of the packing strip into the apex of the recess and to swing the other end of the strip towards the inner wall of the tube.

It is advisable to provide relief holes or vents in the arm of the packing strip. These relief holes prevent a pressure head from forming between the carrier core and the packing strip.

It is evident that the packing can be used for the purpose of sealing anywhere where the tubular roller with carrier core has to contend with similar conditions.

The accompanying drawing shows diagrammatically and by way of example the parts of a tubular roller necessary for explaining the invention. In the drawing:

FIG. 1 is a cross-section through a tubular roller and
FIG. 2 a part longitudinal section of a tubular roller cooperating with a counter roller.

The tube of the tubular roller is designated by 1 and the carrier core by 2. The carrier core 2 is stationary and mounted at its ends, for example, in uprights, whereas the roller tube 1 is rotatable. The carrier core is of smaller cross-sectional area than the inner cross-sectional area of the tube, leaving about its periphery a clearance or gap in relation to the inner wall of the roller tube. This clearance or gap is divided by packing strips into two longitudinal chambers 3 and 4, the chamber 3 being located on the operating side of the roller tube, that is on the side on which working pressure is exerted by the tubular roller. This chamber is filled with a medium, such as oil, which is under pressure as it exerts pressure itself and takes up the working pressure. The medium under pressure may be led into chamber 3 through line 20 from a pump not shown. The medium can be conducted to the chamber 3 in the same way as shown in the Appenzeller U.S. Patent 2,908,964, in which the medium is indicated by 6. The pressure is taken up by the core or carrier 2. No or only slight pressure prevails in the chamber 4. 12 indicates a seal disk that corresponds to the seal disk designated 10 in the Appenzeller U.S. Patent 2,908,964.

The packings for forming the longitudinal chambers and sealing them off from one another, consist of rigid strips 5, for example of bronze. These strips project from the core at an angle and bear against the inner wall of the roller tube. The core or carrier 2 has for each packing strip a V-shaped recess 6 which forms an angle the open end of which faces the pressure direction indicated by the arrow A. As shown in FIG. 1, recess 6 in the core forms an open ended acute angle 14 with a short leg 15 and a long leg 16 cut in the circumference of the core within chamber 4 with the open end of the angle facing toward the pressure chamber 3. Each strip 5 has a long arm 7 and a short arm 8 at an angle thereto. The short arm has a substantially flat bottom 17 and a side face 18 which bears against the inner wall of tube 1. The long leg on its outer side 19 opposite face 18, meets the bottom at an external acute angle. The free end of the long arm 7 forms a knife-edge 9 which engages and pivots in the apex of the angle of the recess. The angle of V-shaped recess 6 in the core is greater than the angle defined by the knife-edge 9. The side 19 of the sealing strip and the long leg 16 of the recess 6 form a diverging angle, so that a gap remains between the sealing strip and the long leg of the recess. The long arm 7 of the strip opposite the carrier or core has relief holes or vents 10.

A spring element, for example in the form of a blade spring 11 is provided on the core 2. Spring 11 protrudes substantially radially from core 2 at the base of side 16 of the recess, into the gap or space between core 2 and tube 1 and between chambers 3 and 4. The strip, fitted into the recess has its short arm 8 in a direction substantially radial to the roller. This spring acts on the radially bent out arm 8 of the packing strip and presses the knife-edge of the packing strip into the apex of the acute angle of the recess and tends to swing the packing strip towards the inner wall of the roller tube 1.

What I claim is:

1. A roller for applying pressure along a side thereof to webs of material, said side comprising the operative side of the roller, said roller having a stationary core supported at its ends, a tube with its outer surface forming the web-contacting periphery of the roller and rotating about the stationary core and having an internal cross-section greater than the cross-section of the core thereby forming a space between the core and the tube throughout its entire internal periphery, closure means at the ends of said tube, in combination with sealing means along opposite longitudinal sides of said core extending to the internal periphery of the tube separating the space between the core and tube into first and second longitudinal chambers, the first chamber being on the operative side of the roller and containing a fluid medium under pressure, said sealing means comprising a pivotable strip having first and second arms at an angle to each other, a V-shaped longitudinal recess in said core, the open end of said recess facing said first chamber, and spring means on said core for pressing said first arm against the internal periphery of said tube, said first arm lying substantially radially of said tube and having a side bearing against the internal periphery of the tube, said second arm having a longitudinal knife-edge for pivoting in said V-shaped recess, the walls of said recess including an acute angle greater than the angle formed by said knife-edge.

2. The improvement claimed in claim 1 wherein said first arm is shorter than said second arm and the second arm is spaced away from the walls of said recess and contains at least one relief hole connecting said recess and said second chamber.

3. The improvement claimed in claim 1 wherein the spring means is a blade spring attached to and projecting from the core and bearing against the first arm of the sealing strip, and pressing said first arm against the internal periphery of the tube.

4. The improvement claimed in claim 1 wherein the sealing strip slants from the core toward the internal periphery of the tube and with a side of the recess forms an angle diverging toward said first chamber, and vents in the strip connect said second chamber with said recess.

References Cited by the Examiner

UNITED STATES PATENTS

| | | | |
|---|---|---|---|
| 2,011,451 | 8/35 | Lockwood | 103—140 XR |
| 2,135,760 | 11/38 | Moore | 103—140 |
| 2,908,964 | 10/59 | Appenzeller | 29—116 |

WALTER A. SCHEEL, *Primary Examiner.*

JOSEPH D. BEIN, *Examiner.*